UNITED STATES PATENT OFFICE.

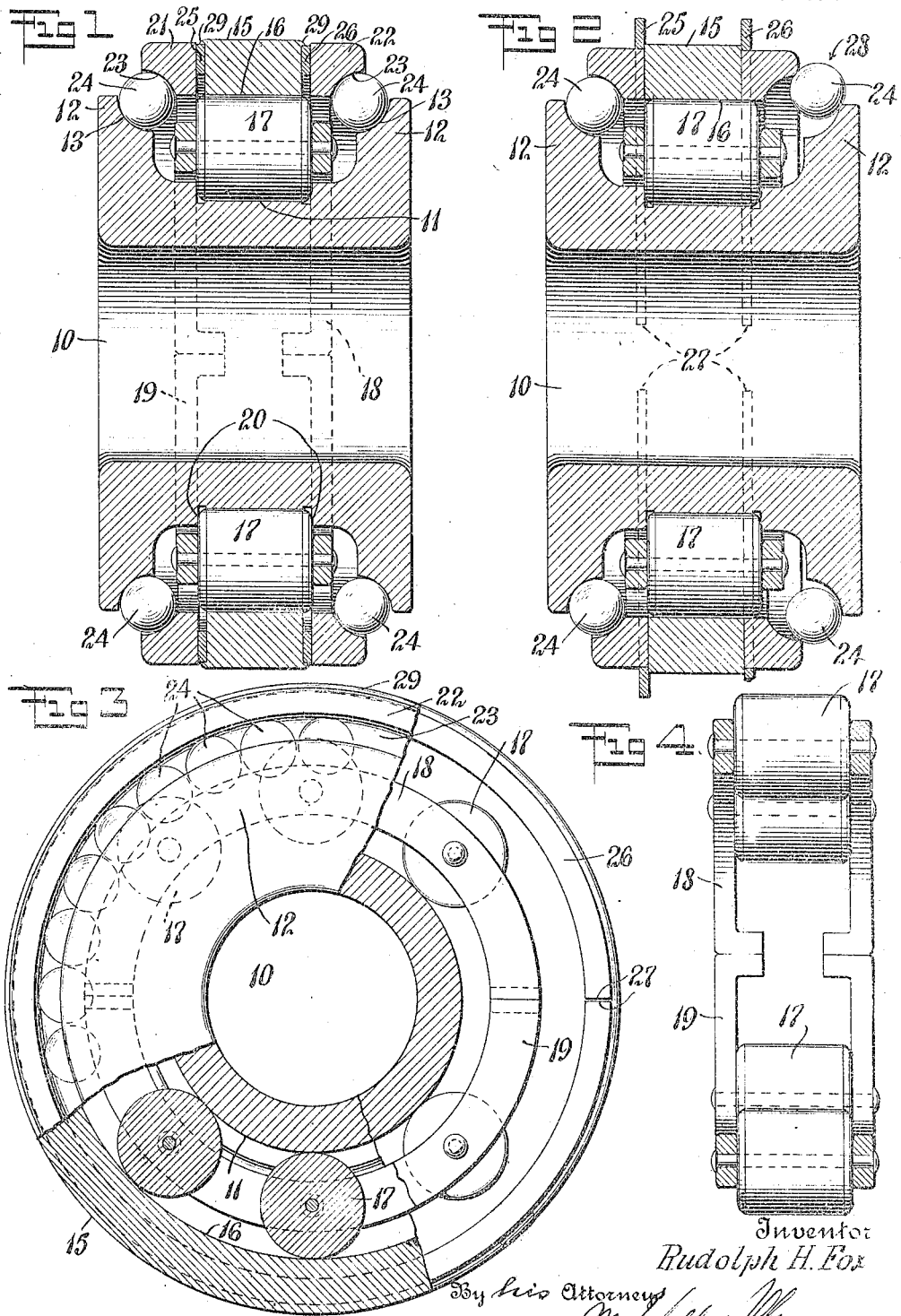

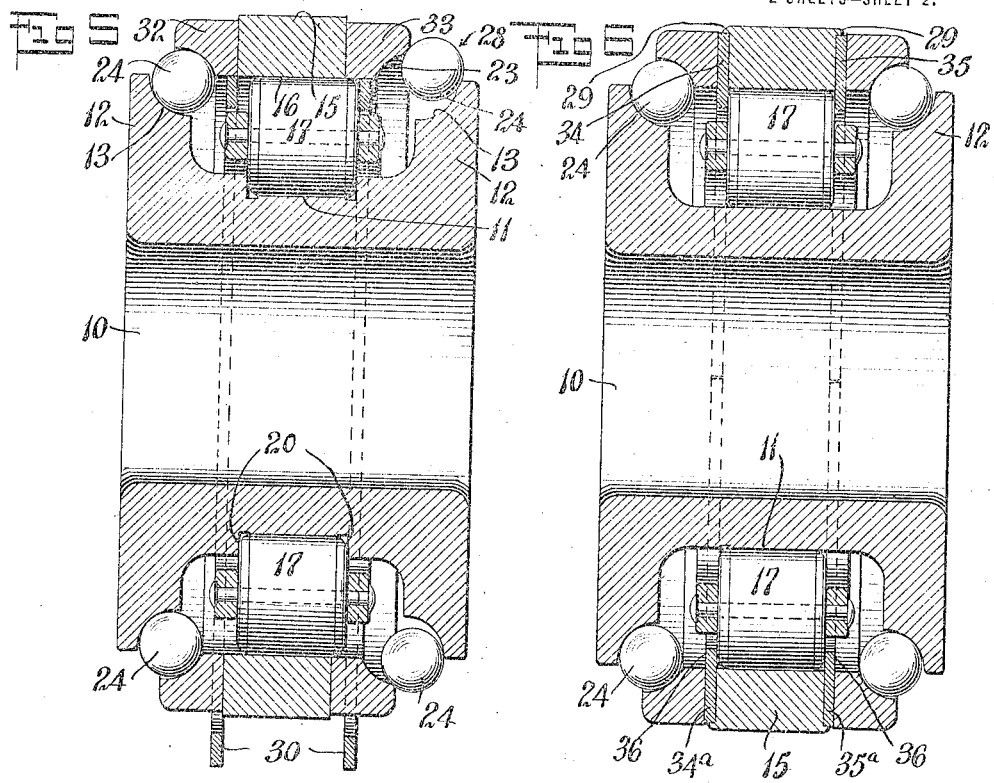
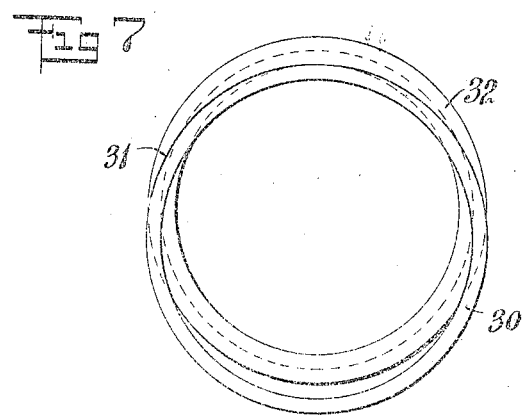

RUDOLPH H. FOX, OF NEW BRITAIN, CONNECTICUT, ASSIGNOR TO THE FAFNIR BEARING COMPANY, OF NEW BRITAIN, CONNECTICUT, A CORPORATION OF CONNECTICUT.

BALL-BEARING.

1,213,090.   Specification of Letters Patent.   Patented Jan. 16, 1917.

Application filed April 5, 1916. Serial No. 39,036.

*To all whom it may concern:*

Be it known that I, RUDOLPH H. Fox, a citizen of the United States of America, residing at New Britain, Connecticut, have invented a new and useful Ball-Bearing, of which the following is a specification.

My present invention relates particularly to combination bearings supporting both radial and thrust loads and the general objects of the invention are to provide a simple, practical and efficient bearing of this character in which the radial load and the thrust load will both be taken care of in the most efficient way without interference in action between the elements carrying the two different loads.

Other objects are to provide a bearing of this character which can be easily assembled and which can be produced at a relatively low cost.

The foregoing and other objects I have attained in my invention by the employment of a bearing member having opposed thrust receiving tracks and between such tracks a radial load supporting track-way, in combination with a second bearing member having a radial load supporting track-way confronting the radial load supporting track-way on the first member and thrust carrying elements disposed at opposite sides of the second bearing member and held in proper confronting relation to the thrust receiving tracks on the first thrust member by spreading means interposed between the second bearing member and the thrust members disposed at the opposite sides of the same.

The spreading means may be in form of rings of the proper thickness to hold the thrust members properly spaced apart and these rings may be held in their proper spreading relation by spinning or peening over the metal at the edges of the second bearing member so as to overlie and securely hold the spreading members.

Other features and details of construction will appear as the specification proceeds, attention being directed to the accompanying drawings forming a part hereof and wherein I have illustrated the invention embodied in several preferred forms.

In said drawings: Figure 1 is a sectional view of a form of the bearing in which the spreading rings are of split construction. Fig. 2 is a similar view illustrating the assemblage of this type of bearing. Fig. 3 is a partial end and broken sectional view of the bearing. Fig. 4 is a detail sectional view of the two-part cage mounting the load supporting elements. Fig. 5 is a sectional view similar to Fig. 2 illustrating the assemblage of that form of bearing in which the spreading rings are of solid one-piece construction. Fig. 6 is a sectional view of an assembled bearing wherein the spreading rings are of segmental construction and serve as guiding flanges for the rollers. Fig. 7 is a detail view illustrating the displacement of the spreading rings during assemblage of the parts shown in Fig. 5.

Referring now to the drawings more in detail: 10 designates an inner bearing member formed with a channel therein at the base of which is provided a load supporting track-way 11 and provided with annular shoulders 12 at the opposite sides of the same formed with oppositely disposed ball tracks 13.

15 designates the outer bearing member, here shown in the form of a ring and provided with a load supporting track 16 confronting the track 11 on the inner bearing member. Engaged between the confronting tracks thus provided are a series of radial-load carrying elements 17. I prefer to use cylindrical rollers as the load carrying elements inasmuch as maximum load capacity in a restricted space is afforded by the use of such rollers. In the illustration, the load-carrying rollers 17 are shown mounted in a retainer made in two semi-circular parts, as indicated at 18 and 19 to permit the assemblage of the retainer in the channeled bearing member.

The lateral or endwise movement of the load-carrying rollers is in the first form of the invention illustrated, limited by confining walls 20 provided at opposite sides of the load supporting track 11.

Bearing members 21 and 22 are located at opposite sides of the radial bearing member 15 and these members are provided with thrust receiving tracks 23 diagonally opposite to and confronting the tracks 13 on the thrust receiving shoulders of the inner bearing member.

A single row of rolling thrust receiving and transmitting elements 24 is interposed between each set of confronting thrust tracks 13—23. These thrust elements are preferably in the form of balls, as such elements constitute the most effective means for carrying the thrust load. I have accordingly illustrated the thrust elements in the drawings in the form of balls and have shown the confronting thrust members formed as ball tracks shaped to properly receive the same.

The two thrust members or rings 21 and 22 are spaced apart to bring the ball tracks thereon into proper confronting relation with the ball tracks on the inner bearing member by spreading means, consisting in the first form of the invention illustrated, of two rings 25 and 26, split or broken as indicated at 27 in Fig. 2 and of a thickness such that when interposed between opposite edges of the outer bearing member and the thrust rings they will hold the thrust rings in proper spaced apart relation.

In the assemblage of the bearing thus far described the two-part retainer mounting the load-carrying rollers is first engaged in the channel in the inner bearing member, and the outer bearing member is then slipped over the end of the inner bearing member into engagement with the rollers bearing on the track thereon. The thrust rings, like the outer bearing member are also of a size to be slipped endwise over the inner bearing member.

Fig. 2 indicates how one ball-race is first filled with balls (see the left hand race in that view) and how by shifting the rings axially the second ball-race can be opened up sufficiently, as indicated at 28, to admit the balls into the second raceway.

After the balls are in place in the raceways the thrust rings are forced apart and the spreading rings are then inserted to hold the members in spread apart assembled relation. In the split ring form of construction this is accomplished by springing the rings open as indicated in Fig. 2 and then after spreading the members apart into final position, engaging the spreading rings in the spaces then provided at the sides of the outer bearing member and between the bearing member and thrust rings. When thus assembled the tracks occupy the position illustrated in Fig. 1, with the thrust rings held spread apart in proper confronting relation to the thrust shoulders on the inner bearing member.

The spreading rings may be made of metal or other suitable material and in this form of bearing the fit is preferably such as to allow the thrust rings to adjust themselves more or less to different relations. For this purpose the outer bearing member 15 is preferably made of slightly larger diameter than the thrust rings so that said thrust rings will not contact the walls of the housing in which the bearing is seated and will be therefore free to adjust themselves.

The spreading rings may be retained in position after the bearing is assembled in various ways as by spinning or peening the metal at the edges of the outer bearing member over the spreading rings at the opposite sides thereof, as indicated at 29 in Fig. 1, the edge portions of the bearing member being in such cases left softer than the working face of the member to permit this spinning operation or by any other equally effective method.

It will be seen from the foregoing that the bearing when assembled constitutes a simple, compact unit which can be readily handled and which can be mounted by simply applying it to the shaft and housing with which it is intended to operate.

In the form of the invention illustrated in Fig. 5 the spreading rings 30 are of continuous or unbroken structure and it is therefore necessary in this form to provide special means for enabling the assemblage of the parts. These special means consist in the illustration in the provision of slots 31 in the faces of the thrust rings 32 and 33 to receive the spreading rings when they have been displaced radially as indicated in Figs. 5 and 7, as more specifically illustrated and described in my copending application No. 63,939.

In Fig. 6 I have illustrated how the spreading rings may be made in halves or segments 34—34ª and 35—35ª, these segments being held in this case as in the preceding case by turning over shoulders 29 at the opposite edges of the outer bearing member 15. Another feature of this form is the utilization of these spreading ring segments as means for retaining the load carrying rollers in proper engagement with the track on the inner bearing member, the ring segments being for this purpose extended in far enough, as indicated at 36, to engage with the ends of the rollers and thereby confine them in their proper path.

My invention, it will be seen provides a bearing in which the radial and thrust load carrying elements operate independently of each other and by the employment of the most efficient means for each of these purposes I obtain a bearing which is thoroughly efficient in every respect.

What I claim is:

1. In a bearing of the character set forth, the combination with radially opposed load supporting members and rolling elements between said members, the whole thus constituting a radial bearing, of thrust shoulders at the opposite sides of said radial bearing fixed in relation to one of the members of said bearing, facing toward each other and providing opposed thrust receiving ball tracks, concentrically arranged thrust members at the opposite sides of the other member of the radial bearing having ball tracks confronting the thrust receiving ball tracks, balls engaging said ball tracks, spreading members interposed between the last mentioned member of the radial bearing and the concentric thrust members at the opposite sides of the same, and said last mentioned member of the radial bearing having means for securing said spreading members in their spreading engagement between the radial bearing member and the thrust members.

2. In a bearing of the character set forth, the combination with radially opposed load supporting members and rolling elements between said members, the whole thus constituting a radial bearing, of thrust shoulders at the opposite sides of said radial bearing fixed in relation to one of the members of said bearing, facing toward each other and providing opposed thrust receiving ball tracks, concentrically arranged thrust members at the opposite sides of the other member of the radial bearing having ball tracks confronting the thrust receiving ball tracks, balls engaging said ball tracks, and spreading rings at the opposite sides of the last mentioned member of the radial bearing interposed between said member and the concentric thrust members to thereby hold said members spread apart in proper engagement with the thrust receiving balls.

3. In a bearing of the character set forth, the combination with radially opposed load supporting members and rolling elements between said members, the whole thus constituting a radial bearing, of thrust shoulders at the opposite sides of said radial bearing, fixed in relation to one of the members of said bearing facing toward each other and providing opposed thrust receiving ball tracks, concentrically arranged thrust members at the opposite sides of the other member of the radial bearing having ball tracks confronting the thrust receiving ball tracks, balls engaging said ball tracks, spreading rings at the opposite sides of the last mentioned member of the radial bearing interposed between said member and the concentric thrust members to thereby hold said members spread apart in proper engagement with the thrust receiving balls, said radial bearing member being of larger diameter than the thrust members at opposite sides thereof and provided with shoulders overlying the spreading rings to thereby retain said spreading rings in proper position.

4. A bearing comprising a channeled member having annular shoulders facing toward each other and providing opposed thrust receiving ball tracks, a pair of bearing members concentrically arranged with respect to said channeled member having ball tracks confronting the ball tracks on said channeled member, said bearing members being displaceable axially toward each other to admit a row of balls between a confronting set of ball tracks, balls engaged between the confronting sets of ball tracks, and spreading means comprising a one-piece spreading member interposed between said bearing members and holding the same spaced apart with the ball tracks thereon in proper coöperative relation with the confronting ball tracks on the channeled bearing member, one of said members having means for enabling the displacement of said one-piece spreading member from its spreading position in between said bearing members to thereby permit said bearing members being brought toward each other for the purpose of opening up the ball raceways.

5. In a bearing of the character set forth, the combination with radially opposed load supporting members and rolling elements between said members, the whole thus constituting a radial bearing, of thrust shoulders at the opposite sides of said radial bearing, fixed in relation to one of the members of said bearing facing toward each other and providing opposed thrust receiving tracks, concentrically arranged thrust members at the opposite sides of the other member of the radial bearing having tracks confronting the thrust receiving tracks, rolling elements engaging said confronting tracks, spreading rings at the opposite sides of the last mentioned member of the radial bearing interposed between said member and the concentric thrust members to thereby hold said members spread apart in proper engagement with the thrust receiving rolling elements, said radial bearing member having parts softer than the other parts of said member and extending beyond the peripheral portions of the spreading rings at opposite sides of the same and turned over said spreading rings to thereby maintain the same in position.

6. In a bearing of the character set forth, the combination with radially opposed load supporting members and rolling elements between said members, the whole thus constituting a radial bearing, of thrust shoulders at the opposite sides of said radial bearing fixed in relation to one of the members of said bearing, facing toward each other and providing opposed thrust receiving tracks, concentrically arranged thrust members at the opposite sides of the other member of the radial bearing having tracks confronting the thrust receiving tracks, rolling elements engaging said confronting tracks, spreading rings at the opposite sides of the last mentioned member of the radial bearing interposed between said member and the concentric thrust members to thereby hold said members spread apart in proper engagement with the thrust receiving rolling elements, said thrust members having a floating fit in respect to the spreading rings at opposite sides of the second radial bearing member whereby said thrust rings are self adjusting in respect to the radial bearing.

7. A bearing comprising, a channeled member having annular shoulders providing two opposed thrust receiving ball tracks, a third bearing track thereon intermediate the thrust receiving ball tracks, a second bearing member having annular shoulders providing two spaced thrust receiving ball tracks arranged to confront the thrust receiving ball tracks on the first member to form two sets of ball race-ways, said second member having a third bearing track intermediate the thrust receiving ball tracks thereon, one of said members being formed of a plurality of parts axially displaceable toward each other to facilitate the assembling of the bearing, with means for spacing said plurality of parts to cause the thrust receiving ball tracks on both of said members respectively to occupy the proper operative relation, and a series of rolling bearing elements arranged between said intermediate bearing tracks and arranged to take a radial load and a series of balls arranged between each set of opposed thrust receiving ball tracks to take thrust.

RUDOLPH H. FOX.